United States Patent
Acharya et al.

(10) Patent No.: US 7,864,690 B2
(45) Date of Patent: Jan. 4, 2011

(54) SYSTEM AND METHOD FOR REROUTING CIRCUITS ON SONET AND SDH RINGS WITHOUT DISRUPTING SERVICE

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1736 days.

(21) Appl. No.: 10/637,289

(22) Filed: Aug. 8, 2003

(65) Prior Publication Data

US 2005/0030901 A1 Feb. 10, 2005

(51) Int. Cl.
*H04L 1/00* (2006.01)

(52) U.S. Cl. ............... 370/248; 370/222; 370/228; 370/258

(58) Field of Classification Search ............ 370/248, 370/222, 223, 224, 241, 244, 254, 258, 216, 370/221, 225, 228
See application file for complete search history.

(56) References Cited

U.S. PATENT DOCUMENTS

| | | | | | |
|---|---|---|---|---|---|
| 5,608,720 | A | * | 3/1997 | Biegel et al. | 370/249 |
| 5,745,476 | A | * | 4/1998 | Chaudhuri | 370/222 |
| 5,818,842 | A | * | 10/1998 | Burwell et al. | 370/397 |
| 6,188,667 | B1 | * | 2/2001 | Roberts et al. | 370/219 |
| 6,246,668 | B1 | * | 6/2001 | Kusyk | 370/228 |
| 6,754,175 | B1 | * | 6/2004 | Akinpelu et al. | 370/228 |
| 7,130,263 | B1 | * | 10/2006 | Ong et al. | 370/223 |
| 2002/0071392 | A1 | * | 6/2002 | Grover et al. | 370/241 |
| 2002/0118636 | A1 | * | 8/2002 | Phelps et al. | 370/222 |
| 2002/0131368 | A1 | * | 9/2002 | Raftelis et al. | 370/241 |
| 2003/0048776 | A1 | * | 3/2003 | Loeffler-Lejeune | 370/360 |
| 2003/0235153 | A1 | * | 12/2003 | Lee et al. | 370/229 |

OTHER PUBLICATIONS

"Hardness of Path-Exchange Problem" by B. Shepherd and A. Gupta; Personal Communication; Oct. 22, 2001; 2 pg.

M.3100; "Definition of the Management Interface for a Bridge-and Roll Cross-Connect Feature" Amendment 4; ITU-T; Aug. 2001; 15 pg.

"Demand Routing and Slotting on Ring Networks" by T.J. Carpenter, et al.; DIMACS Technical Report; Tech. Rep.; Jan. 1997; 28 pg.

"The Ring Loading Problem" by A. Schrijver, et al.; SIAM Journal of Discrete Math; vol. 11, No. 1; Feb. 1998;14 pg.

"MPLS Network Tuning: Enabling Hitless Network Engineering" S. Acharya, et al.; International Conference on Communications; 2003; 5 pg.

(Continued)

*Primary Examiner*—Ricky Ngo
*Assistant Examiner*—Luat Phung
(74) *Attorney, Agent, or Firm*—Hitt Gaines, PC (57) ABSTRACT

A system and method for rerouting circuits on a SONET, SDH or similar ring without disrupting service. In one embodiment, the system includes: (1) a route design subsystem adapted to identify, for the circuits, alternative routes that are subject to an alignment constraint and increase an objective value associated with the ring and (2) a path migration subsystem, associated with the route design subsystem, adapted to determine a hitless migration sequence that allows the alternative routes to be employed.

24 Claims, 5 Drawing Sheets

OTHER PUBLICATIONS

"Optimal Load Balancing on SONET Bidirectional Rings" by Y. Myung, et al.; Operations Research; vol. 45; Jan. 1997; pp. 148-152.

SONET Bidirectional Line Switched Ring Equipment Generic Criteria: GR-1230-CORE; Bellcore; Dec. 1998; 235 pg.

* cited by examiner

FIG. 1A          FIG. 1B

- Input: CIRCUITS D, Objective function Z
- Output: New re-routing sequence for D 1.) $Z_{curr} \leftarrow$ Value of $Z$ on current layout.
2.) $Z_{max} \leftarrow Z_{curr}$.
3.) For each circuit $d_j \in D$
     a) For each feasible alternate route for $d_j$ obtained by changing the orientation and/or slot assignment.
         i) compute $Z_{new}$ for layout with this new route for $d_j$.
         ii) If $Z_{new} > Z_{max}$, then $Z_{max} \leftarrow Z_{new}$. Record new route for $d_j$.
4.) If $(Z_{max} = Z_{curr})$, Terminate.
5.) Perform the move that results in $Z_{max}$.
6.) $Z_{curr} \leftarrow Z_{max}$.
7.) go to step 3

FIG. 2

| SPAN | STS GRANULARITY | | |
| LENGTH | 1 | 3c | 12c |
|---|---|---|---|
| 1 | 4 | 4 | 1 |
| 2 | 0 | 0 | 0 |
| 3 | 0 | 0 | 0 |
| 4 | 2 | 0 | 0 |
| 5 | 5 | 1 | 0 |
| 6 | 0 | 0 | 0 |
| 7 | 0 | 0 | 0 |
| 8 | 3 | 1 | 0 |

*FIG. 3A*

| SPAN | STS GRANULARITY | | |
| LENGTH | 1 | 3c | 12c |
|---|---|---|---|
| 1 | 0 | 0 | 0 |
| 2 | 0 | 0 | 0 |
| 3 | 3 | 1 | 1 |
| 4 | 3 | 1 | 0 |
| 5 | 4 | 2 | 0 |
| 6 | 1 | 0 | 0 |
| 7 | 0 | 0 | 0 |
| 8 | 1 | 0 | 0 |

SYSTEM AND METHOD FOR REROUTING CIRCUITS ON SONET AND SDH RINGS WITHOUT DISRUPTING SERVICE

TECHNICAL FIELD OF THE INVENTION

The present invention is directed, in general, to multiplexed communication links and, more specifically, to a system and method for rerouting circuits on Synchronous Optical NETwork (SONET) or similar rings without disrupting service.

BACKGROUND OF THE INVENTION

The last few years have seen a significant growth in of Synchronous Optical NETwork (SONET) and Synchronous Digital Hierarchy (SDH) deployments by telecommunications service providers. (Since the present invention applies to SONET, SDH and similar network protocols equally well, only SONET networks will be explicitly discussed hereinafter.)

While initially intended for voice traffic, SONET networks have come to provide the underlying transport for the growing Internet data traffic. Unfortunately, unlike voice, data traffic has more variance and therefore creates greater "churn" (a building up and tearing down of links) in the network. As the data traffic continues to grow and the capital budgets of service providers fail to keep up (or even diminish), providers are increasingly seeking network engineering tools that enable them to extract higher utilization from their existing infrastructure.

Figure 1A:
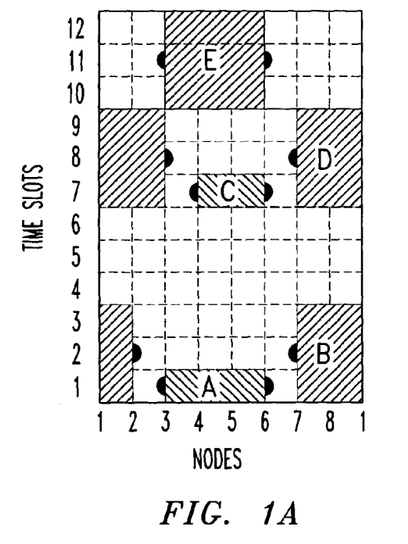
FIGS. 1A and 1B together illustrate a graphical, schematic representation of an exemplary network engineering operation.
Figure 1B:
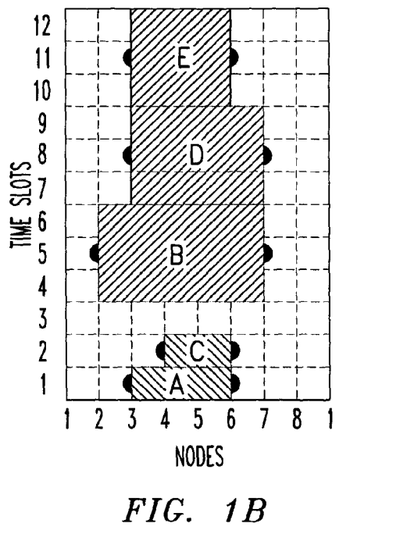

Referring initially to FIGS. 1A and 1B, illustrated is a graphical, schematic representation of an exemplary network engineering operation. The operation involves an 8-node STS-12 Bidirectional Line-Switched Ring (BLSR) (see, e.g., Goralski, SONET, 2nd ed., McGraw-Hill Companies, 2000, incorporated herein by reference in its entirety) represented as a 12×8 grid, split across node 1 with the x-axis representing the nodes and the y-axis the time slots.

FIG. 1A shows as shaded rectangles five circuits (circuits A, B, C, D, E) on the ring. For example, a STS-1 circuit A exists from node 3 to 6 on slot 1, and a STS-3c circuit B exists on slots 1-3 from node 2 to 7. A circuit can be routed in either clockwise or counter-clockwise direction (as in the case of circuit B). Now, for purposes of the demonstration, a new request is made for a STS-12c circuit from node 2 to 7. Unfortunately, the request would be denied, because 12 contiguous slots of bandwidth between nodes 2 and 7 do not exist. Unfortunately, sufficient bandwidth does in fact exist on the ring for the STS-12c demand, but, as FIG. 1A makes apparent, it is fragmented.

Turning now to FIG. 1B, the same five circuits A, B, C, D, E have now been routed differently. In this layout, the new STS-12c circuit request would be granted. The new layout is the product of effective network engineering.

As beneficial as it has been demonstrated to be, network engineering suffers a critical constraint. Since it is performed on operational networks that carry live traffic, it should be hitless, i.e., cause no service disruption. Thus, in addition to optimizing the layout of circuits, it is equally important to determine a hitless rerouting sequence to migrate the ring from the original to this new layout. Otherwise, rerouting is of little practical use.

In traditional SONET rings consisting of add-drop elements, rerouting traffic was often a cumbersome task and in many cases, impossible to achieve without disruption. However, newer SONET network elements are increasingly supporting traditional add-drop capability with a more mesh-like cross-connect functionality. Thus, these new element can support a "bridge-and-roll" functionality (see, M.3100, "Definition of the Management Interface for a Bridge-and-Roll Cross-Connect Feature," Amendment 4, ITU-T, August 2001, incorporated herein by reference in its entirety). This enables circuits to be first bridged on to the new route and then rolled over seamlessly with no service interruption, akin to make-before-break in MPLS (see, e.g., Awduche, et al., "RSVP-TE: Extension to RSVP for LSP Tunnels," IETF RFC 3209, 2001, incorporated herein by reference in its entirety).

Three ways exist to reroute circuits on a SONET ring: (1) moving a circuit to a different time slot (e.g., circuit C), (2) reversing the direction of the route of the circuit (e.g., from a clockwise to a counter-clockwise direction (e.g., circuit D) and (3) doing both (e.g., circuit B). Thus, rerouting circuits C, D and B (in that order) using bridge-and-roll ensures a migration with no perceived service hit.

The requirement to provide a disruption-free transition sequence fundamentally differentiates network engineering from network design. Moreover, it precludes periodically redesigning the circuit routes to achieve the same goal. Network engineering, thus, requires addressing two critical, yet distinct problems: "route design" and "path migration," both of which are theoretically "hard" problems to solve. Scaling network engineering to larger rings (e.g., STS-48/192) with more nodes proves an extremely difficult challenge.

Extensive research has been done in the area of SONET ring design. For example, Cosares, et al., "An Optimization Problem Related to Balancing Loads on SONET Rings," Telecommunication Systems, vol. 3, 1994, incorporated herein by reference in its entirety; Myung, et al., "Optimal Load Balancing On SONET Bidirectional Rings," Operations Research, vol. 45, January 1997 incorporated herein by reference in its entirety; and Schrijver, et al., "The Ring Loading Problem," SIAM Journal of Discrete Math, vol. 11, no. 1, February 1998, incorporated herein by reference in its entirety, have studied the SONET ring loading portion of the problem and developed efficient heuristic algorithms. The portion of the problem that involves assigning time slots given a routing, is known to be NP-hard (see, e.g., Garey, et al., *Computers and Intractability—A Guide to the Theory of NP-Completeness*, Freeman, Calif., USA, 1979, incorporated herein by reference in its entirety) and follows from the circular arc graph coloring problem. A comprehensive treatment of all the aspects of SONET ring design is available in Carpenter, et al., "Demand Routing and Slotting on Ring Networks," DIMACS technical Report, Tech. Rep., January 1997 incorporated herein by reference in its entirety; and Cosares, et al., "Network Planning with SONET Toolkit," Bellcore Exchange, September 1992, incorporated herein by reference in its entirety.

Unfortunately, these contributions do not account for the alignment property, which will be described in detail below. Unlike ring design, very little prior work has been undertaken on the hitless path migration problem. Shepherd, et al. ("Hardness of Path Exchange Problem," Personal Communication, incorporated herein by reference in its entirety) proved that path migration is NP-hard in the general case of a mesh network.

Accordingly, what is needed in the art are effective systems and methods for achieving hitless network engineering with respect to SONET (and similar) rings.

SUMMARY OF THE INVENTION

To address the above-discussed deficiencies of the prior art, the present invention provides a system for rerouting circuits on a ring. In one embodiment, the system includes: (1) a route design subsystem adapted to identify, for the circuits, alternative routes that are subject to an alignment constraint and increase an objective value associated with the ring and (2) a path migration subsystem, associated with the route design subsystem, adapted to determine a hitless migration sequence that allows the alternative routes to be employed.

In another aspect, the present invention provides a method of rerouting circuits on a ring. The method includes: (1) identifying, for the circuits, alternative routes that are subject to an alignment constraint and increase an objective value associated with the ring and (2) determining a hitless migration sequence that allows the alternative routes to be employed.

The present invention therefor introduces an efficient engineering solution for SONET (and similar) rings that takes the alignment property (to be described below) into account. Instead of infrequently engineering the network as done today due to high overhead, the present invention enables providers to perform network engineering proactively. Proactive network engineering maintains high levels of efficiency all through a network, saving capital over time.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

It has been found that network engineering with respect to SONET (and similar) rings involves the solution of a problem referred to herein as the Ring Rearrangement Problem (RRP). Before formally describing RRP, five assumptions derived from SONET/SDH constraints that pertain to RRP will be highlighted. For complete details on SONET/SDH, the reader is referred to Goralski, supra. The five assumptions are as follows:

(1) Demand Granularity: Circuits are assumed to follow SONET STS hierarchy, namely that circuits are one of STS-<1,3c,12c,48c,192c> with each STS-nc circuit carrying n times the capacity of a STS-1 circuit.

(2) Alignment property: SONET also imposes an alignment property, namely that a STS-nc circuit can only use slots s to (s+n−1) such that s≡1(mod n). In other words, a STS-3c circuit can be provisioned starting only at slots 1, 4, 7, 10, etc., and a STS-12c circuit can be provisioned only at slots 1, 13, 25, etc. Surprisingly, in spite of its criticality, this alignment property has rarely been considered in the body of prior art directed to loading and sizing SONET systems (e.g., Cosares, et al.; Myung, et al.; and Schrijver, et al., supra).

(3) BLSRs: The engineering of BLSRs will be the focus herein. Unlike Unidirectional Path-Switched Rings (UPSRs), BLSRs enable higher utilization by routing each circuit only along one side, and allowing protection bandwidth to be shared among circuits. However, those skilled in the pertinent art will be able readily to apply the principles of the present inventions to unprotected circuits on UPSRs.

(4) Time Slot Assignment (TSA): In a TSA ring system, a circuit is required to follow the same slots on all the links along its path from the source to the destination node. A TSA system has a less complex logic for protection switching and is enforced in the well-known Bellcore standard GR-1230-CORE ("SONET Bidirectional Line Switched Ring Equipment Generic Criteria," Bellcore, November 1995, incorporated herein by reference in its entirety).

(5) Bridge-and-Roll: Support for Bridge-and-Roll functionality to provide hitless migration will be assumed.

Having set forth the five underlying assumptions, RRP is now defined as follows:

RRP definition: Given is a ring with a set of circuits D where each circuit $d_i \in D$ is identified by a tuple $<s_i, t_i, g_i>$, $s_i$ and $t_i$ being the source and destination node of $d_i$ and $g_i$ the granularity in terms of number of slots. Also, given is a current map $\psi:\{d_i \rightarrow \{r_i, o_i\}\}$, where $r_i$ is the starting slot number of the circuit and $o_i$ is the orientation of the circuit (clockwise or counter-clockwise). RRP is defined thus:

Given the above and an objective function Z, find:

(a) a new map $\psi'$ that maximizes Z, and (b) a hitless rerouting sequence for the circuits to transition from $\psi$ to $\psi'$ in a bridge-and-roll fashion.

Solving RRP involves addressing two problems, namely route design and path migration problems, which correspond to each of the two requirements. The first is a variant of the well-known demand routing and slotting problem (DRSP) (see, Carpenter, et al., supra). The ring sizing and the ring loading are specific examples of the DRSP and these are proven to be NP-hard.

Good approximations to these problems do exist (e.g., Cosares, et al.; Myung, et al.; and Schrijver, et al., supra). Unfortunately, these solutions do not suffice for RRP. They do not account for the alignment property, which complicates the slotting. Even if one were able to account efficiently for alignment, the second requirement of a hitless migration sequence still remains. Unfortunately, such a sequence may not exist at all and in general, it has also been shown to be NP-hard (see, Shepherd, et al.). Thus, a two step approach to solving RRP is of only limited value in practice where a hitless migration is key.

A novel algorithm will now be introduced and followed by a description of the objective function that the algorithm takes as an input. The pseudocode for the algorithm is presented in FIG. 2. The algorithm is iterative and attempts to reroute circuits one at a time.

Figure 2:
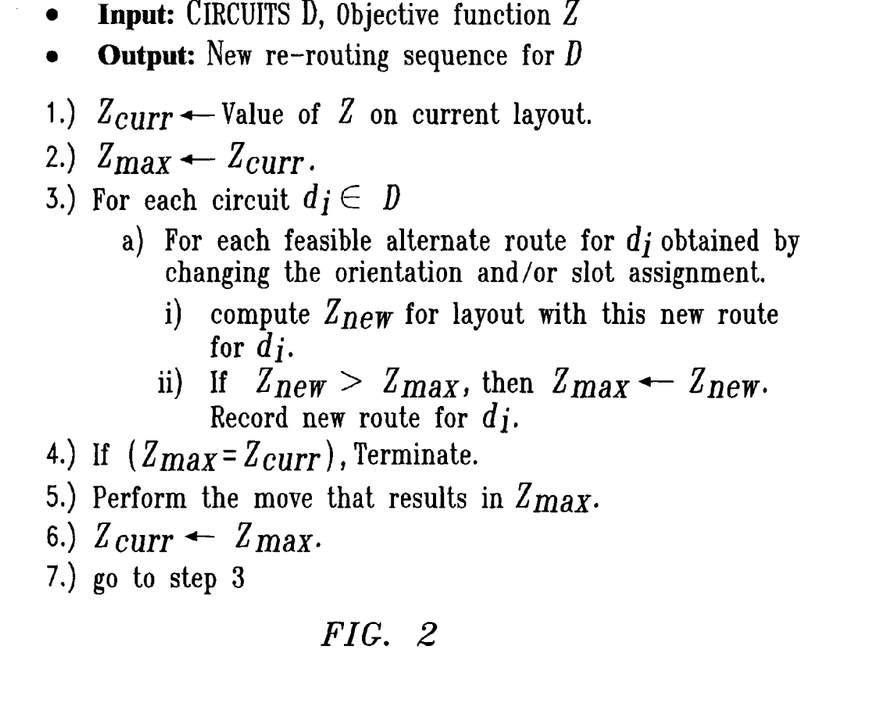
FIG. 2 illustrates a pseudocode listing of an efficient algorithm for network engineering constructed according to the principles of the present invention.

For every circuit in the network, the algorithm determines all possible ways to reroute it on the existing network. Recall that as described above, three ways exist for doing this. For each reroute, the algorithm determines the change in the objective function. The algorithm does so for all the circuits, and the one that provides the maximum increase in the objective value, is chosen to be rerouted. This process repeats until no reroute improves the objective value, at which point the algorithm terminates.

Since the algorithm makes a greedy choice at every step, it is possible that it settles on a local maximum for the objective function. Finding the global maximum is the desired goal. However, as pointed out above, ensuring global optimality is a theoretically hard (NP-hard) problem and therefore, unlikely to be achievable in practice. Besides, from the service provider's perspective, any improvement is desirable particularly if it creates no service disruption. In fact, experiments described below demonstrate that the algorithm is indeed effective in practice.

From a service provider's perspective, the goal of network engineering is to increases the revenues from the existing infrastructure. This suggests that the layout of the free time slots on the ring mirror the future demand pattern. Thus, an effective objective function is one that accurately valuates the "worth" of the layout of free slots. However, determining a "good" layout is not always obvious.

Turning again to the two networks represented in FIGS. 1A and 1B, the initial layout (FIG. 1A) was poor because it disallowed STS-12c requests from nodes 2 to 7. However, the network could support a STS-3c request from nodes 4 to 7 (along slots 4-6) that the layout in FIG. 1B would not. Thus, the granularity and the future demand pattern makes one or the other layout more appropriate. Naturally, this raises the following two questions:

(1) Given two networks, what is a metric to compare the relative "worth" of their free slots?
(2) Given multiple circuits can be satisfied by the same set of slots (e.g., one STS-3c circuits or three STS-1 circuits), how does one value one over the other?

Figure 3A:
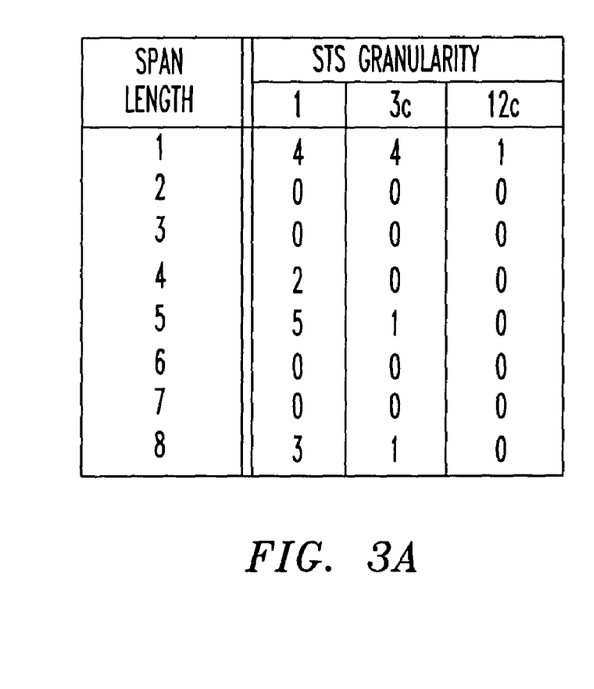
FIGS. 3A and 3B together illustrate packing sets for the exemplary network engineering operation of FIGS. 1A and 1B, respectively.
Figure 3B:
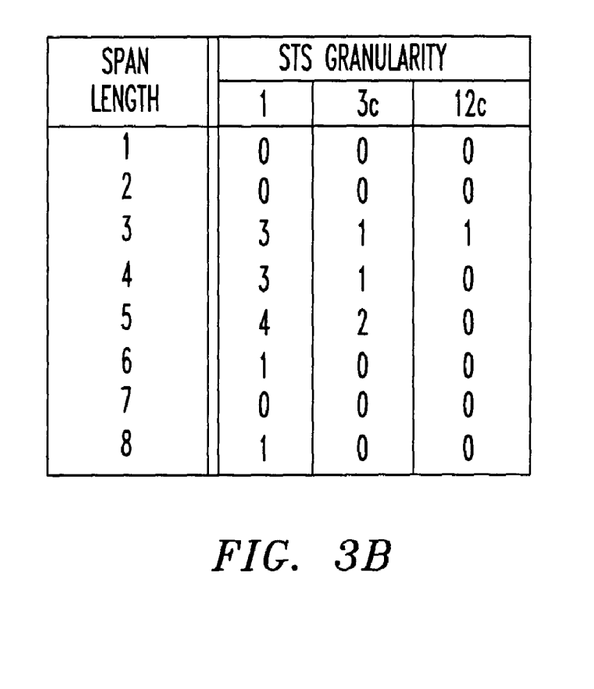

The concept of a "packing set" is defined to address the first problem. A packing set of granularity g is the minimum number of new circuits of bandwidth g that would pack the ring to the fullest extent possible. FIGS. 3A and 3B show the packing set for the two networks in FIGS. 1A and 1B respectively, sorted on the number of ring spans. Thus, FIG. 1A requires at least six STS-3c circuits to fill up: four of length one and one each of lengths five and eight. FIG. 1B shows that the while the original layout could support only a 1-span STS-12c circuit, engineering allows a 3-span STS-12c to be satisfied.

Packing sets provide a fair metric, since they use the minimum number of new circuits to enumerate the ability to satisfy future requests. Determining the packing set is a straightforward task for those skilled in the pertinent art; thus, the details are omitted here.

Service providers typically have some broad knowledge of future demands. In the absence of this domain knowledge, a heuristic function f is used to balance among circuits of different granularities and different span lengths. Various options for f will be explored below.

Given this background, the illustrated embodiment of the algorithm uses the following objective function Z to evaluate the worth of a network:

$$Z = \sum_{i \in \{1,3,12,...\}} \sum_{c_k \in P_i} f(g(c_k), l(c_k))$$

where $P_i$ is the packing set for granularity i, and $g(c_k)$ and $l(c_k)$ are the granularity and length respectively of circuit $c_k$ in $P_i$. Thus, given a network, the packing set is first determined for different granularities that the network can support. Then, the function is evaluated to determine its worth. This provides the basis for comparison among different ring layouts. The objective function is orthogonal to the algorithm itself. Those skilled in the pertinent art understand that any alternative function may be provided to the algorithm without departing from the broad scope of the present invention.

Figure 4:
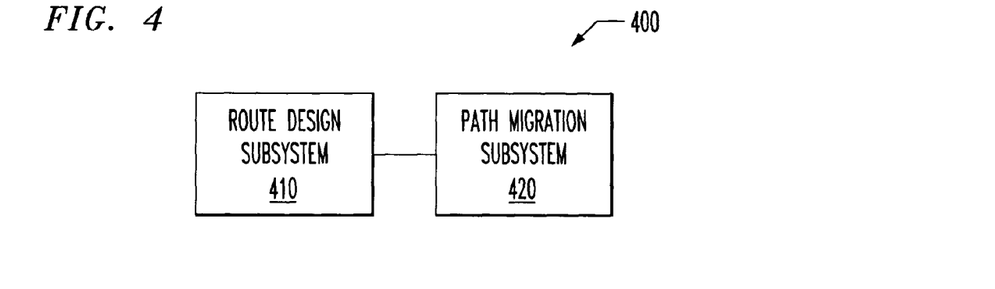
FIG. 4 illustrates a block diagram of a system for rerouting circuits on a SONET, SDH or similar ring without disrupting service constructed according to the principles of the present invention.

Turning now to FIG. 4, illustrated is a block diagram of a system, generally designated 400, rerouting circuits on a SONET, SDH or similar ring without disrupting service constructed according to the principles of the present invention. The system 400 comprises a route design subsystem 410. The route design subsystem 410 is adapted to identify, for the circuits that are on the ring, alternative routes. As stated above, the alternative routes are subject at least to an alignment constraint and increase an objective value associated with the ring. More preferably, the route design subsystem 410 identifies alternative routes that at least locally (and more preferably globally) maximize the objective value.

The system 400 further includes a path migration subsystem 420. The path migration subsystem 420 is associated with the route design subsystem 410 and is adapted to determine a hitless migration sequence that allows the alternative routes to be employed. The route design subsystem 410 and the path migration subsystem 420 may be embodied in a sequence of computer-executable instructions that may function in general accordance with the novel algorithm set forth above.

Figure 5:
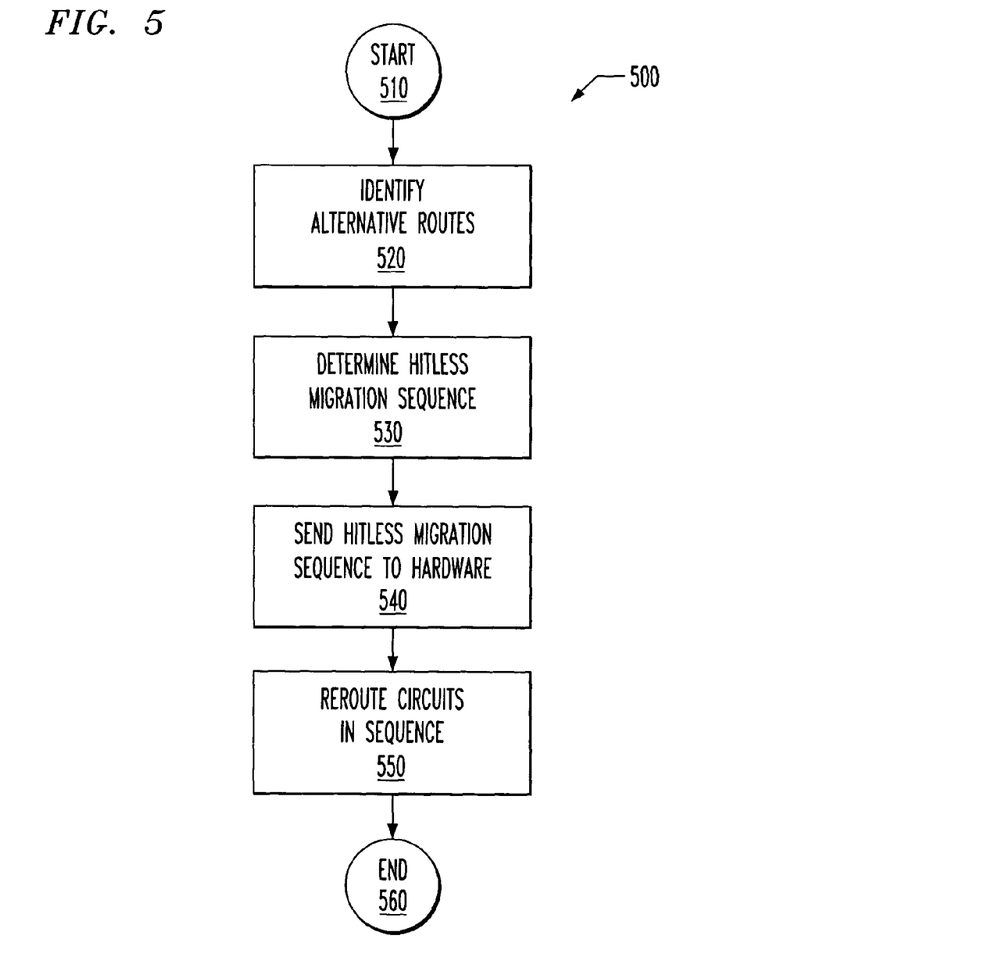
FIG. 5 illustrates a flow diagram of a method of rerouting circuits on a SONET, SDH or similar ring without disrupting service carried out according to the principles of the present invention.

Turning now to FIG. 5, illustrated is a flow diagram of a method, generally designated 500, of rerouting circuits on a SONET, SDH or similar ring without disrupting service carried out according to the principles of the present invention. The method 500 begins in a start step 510, when it is desired to bring the benefits of network engineering to a particular ring by potentially rerouting some or all of its circuits. The method 500 proceeds to a step 520 in which alternative routes are identified for the circuits. Again, the alternative routes are subject to at least an alignment constraint and increase an objective value associated with the ring. Having found suitable alternative routes, the method 500 proceeds to a step 530 in which a hitless migration sequence that allows the alternative routes to be employed is determined. The hitless migration sequence ensures that service is not disrupted as the circuits are rerouted to their more advantageous alternative routes.

The method 500 then proceeds to a step 540 in which the hitless migration sequence is provided to conventional ring control hardware. In a step 550, the ring control hardware causes the circuits to be rerouted in accordance with the hitless migration sequence. The method ends in an end step 560. Those skilled in the art should understand that, as circuits are added and dropped from the ring over time, the method 500 may be carried out again to perform further network engineering with respect to the ring.

Now, the performance of the algorithm will be explored for various objective functions. As pointed out earlier, no known heuristic exists to solve RRP. However, to provide a "loose" benchmark, the results from the algorithm will be contrasted with that of a known ring design algorithm that minimizes the size of the ring (ring sizing problem). This known ring design algorithm will be referred to hereinafter as "Ideal."

Ideal yields routes within four times the optimal routing using techniques suggested in Cosares, et al. and Myung, et al., supra. The technique in Myung, et al., supra, will be used for ring loading to route circuits within a factor of two to the optimal. Then, Tucker's algorithm, as suggested in Cosares, et al., supra, will be used for slotting within another factor of two to the optimal.

However, Ideal is impractical for various reasons. First, Ideal does not produce a path migration sequence (and which may not exist at all). Second, Tucker's algorithm does not account for the alignment constraint. Thus, Ideal merely provides a loose theoretical bound and helps compare the ability of the algorithm and Ideal to minimize the ring size.

The results of the experiments are based on extensive simulations on a 16-node, STS-48 BLSR. Circuit requests were generated among any randomly chosen source-destination pair with the granularity also chosen randomly. Twenty percent of the requests were circuit deletions to mirror an operational network. The circuits were routed along the shortest path between source and destination and its slot was chosen in a first-fit manner (accounting for the alignment constraint). Requests were generated until a new request failed to be routed and this then formed the input to the algorithm and Ideal.

Two objective functions were used to evaluate the performance of the algorithm.

(1) Length Metric (LTM): In this case, the goal of the engineering operation was to attempt to find the longest sequence of free spans and thereby aim to free as many STS-1 rings as possible. This is the analog of the ring sizing problem (see, Carpenter, et al., supra) and is the basis for the comparison of the algorithm and Ideal. Formally stated, the objective function is as follows:

$$f(g(c_k), l(c_k)) = (g(c_k)^{2} * 2^{l(c_k)})$$

Thus, the length of the free area is exponentially weighed compared to its width. Thus, this function will nudge the algorithm to create a space for a 6-span STS-1 as opposed to a 2-span STS-3 if it had access to six free slots.

(2) Square Metric (SQM): In this case, the width of the free space is equally valuable as the length. Formally, $$f(g(c_k), l(c_k)) = (g(c_k) * l(c_k))^2$$

Thus, in this case free space for a 2-span STS-3 is as valuable as that for a 6-span STS-1.

Experiment 1: Example Network Analysis

Figure 6A:
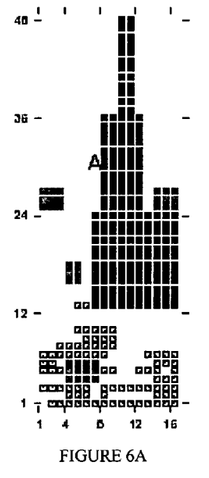
FIGS. 6A through 6D together illustrate graphical, schematic representations of ring analyses.
Figure 6B:
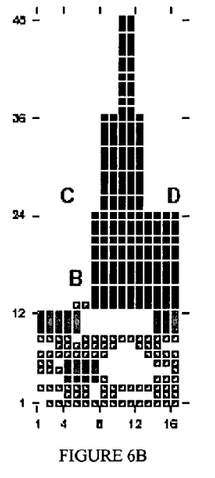
Figure 6C:
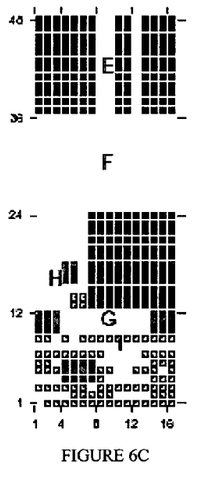
Figure 6D:
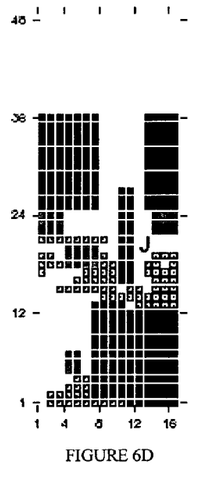

FIGS. 6A through 6D together show the results of the various algorithms for one specific network layout. As before, these diagrams represent the 16-node STS-48 ring, with nodes on x-axis and slots on y-axis. The granularity of each circuit is represented by the color/pattern on the grid. FIG. 6A shows the original layout of circuits in the ring. FIGS. 6B and 6C represent the results of the algorithm after engineering using SQM and LTM, respectively. FIG. 6D shows the results of Ideal.

With reference to FIG. 6B, the goal of the SQM metric is to create large rectangular areas of free slots and does so by emptying out three areas B, C and D of the existing STS-3c circuits by moving them to lower slots. In contrast, the goal of the LTM metric is to create long free spans as shown in FIG. 6C. Thus, the LTM metric takes the STS-12c demand A, reroutes it counter-clockwise across the ring and moves it up to E to create a free STS-12c ring F. Moreover, the LTM metric also manages to free up an STS-1 over the entire span of ring I by rerouting STS-1 circuits and a longer STS-3c span G.

Finally, FIG. 6D shows the results of Ideal that attempts to minimize the ring size. Recall that the routing is impractical since the alignment constraints are not met (e.g., the STS-12c circuit starts on slot 16). However, in spite of such advantages and designing from scratch, Ideal does not design a smaller size ring compared to the algorithm with the LTM metric (both free up a STS-12 ring). This shows that when comparing the ability to size a ring, the algorithm is a good match to Ideal and unlike it, can achieve its gains in a hitless manner.

Experiment 2: Gains Analysis

Figure 7A:
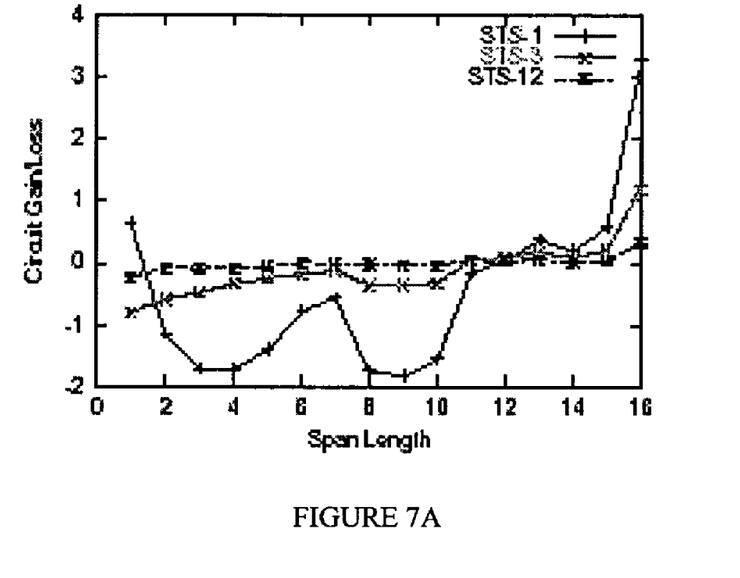
FIGS. 7A and 7B together illustrate graphical representations of gains realizable from network engineering based on SQM and LTM metrics.
Figure 7B:
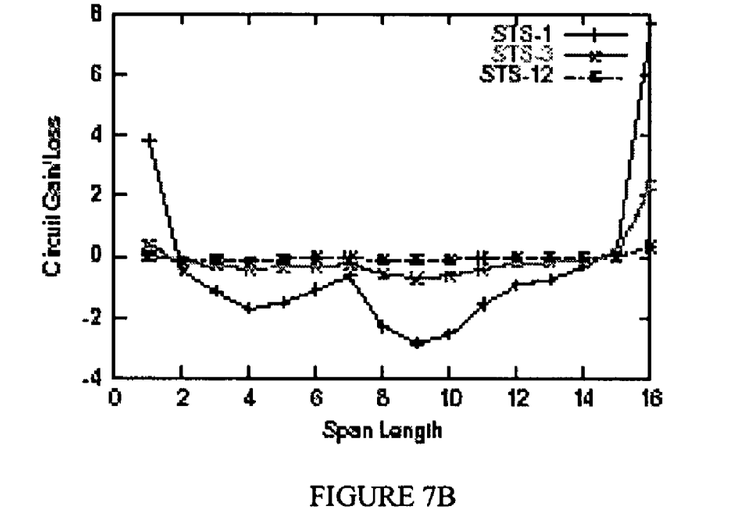

While Experiment 1 demonstrated the mechanics of each heuristic on a single example network, it is worthwhile to quantify the gains in general. FIGS. 7A and 7B together illustrate the improvement in the packing set due to engineering for different circuit granularities. The x-axis represents the span length and y-axis represents the difference per span between the packing sets of the engineered and the original network. The data are averaged over 200 independent runs.

Consider the SQM case, illustrated in FIG. 7A. FIG. 7A shows that, as expected, the engineering operation harvests free slots of shorter length to create longer free slots of 12 spans or more. Thus, while nearly two STS-1 circuits of length 4 are lost, The algorithm produces more than 3 STS-1s that span the entire ring (16 span length). The gains for STS-3c (1 ring freed) and STS-12c (⅓ ring freed)), as expected are lower in absolute terms but similarly impressive.

The LTM case, illustrated in FIG. 7B, shows a slightly different result. The LTM case shows a gain primarily for only circuits that span the entire ring (16 spans). Since LTM weighs the length exponentially, it would prefer to create a 16-span STS-1 as opposed to say, a 8-span STS-3 (which SQM would choose). Consequently, the LTM frees up eight STS-1 rings on the average compared to only three STS-1 rings for the SQM case. However, unlike SQM, LTM creates little free space if the circuit does not span the entire ring (e.g., in the 12-15 length range).

These results demonstrate the algorithm is effective and effectively engineers the network. For the SQM metric, it is able to create free spaces that balance both the length and granularity whereas the LTM is successful in clearing out long free spans. The LTM and SQM metrics require 21.76 and 17.84 circuit reroutes on the average respectively, which are within acceptable limits. Given that the gains brought about by these reroutes cause no service disruption, the algorithm is attractive.

Although the present invention has been described in detail, those skilled in the art should understand that they can make various changes, substitutions and alterations herein without departing from the spirit and scope of the invention in its broadest form.

What is claimed is:

1. A system for rerouting circuits on a ring, comprising:
   a route design subsystem for defining a sequence of time slots, each time slot corresponding to a circuit capacity unit, an alternative route for a circuit on said ring being identified subject to an alignment constraint and being assigned a number of contiguous time slots in said sequence, wherein said number of contiguous time slots corresponds to multiple circuit capacity units required by said circuit, and said assigned time slots start at one of given pre-selected specific time slots in said sequence pursuant to said alignment constraint; and a path migration subsystem, associated with said route design subsystem, that determines a hitless migration sequence that allows said alternative route to be employed;

wherein said route design and path migration subsystems are configured to reroute multiple circuits at any given time.

2. The system as recited in claim 1 wherein route design subsystem employs a greedy algorithm to identify said alternative route.

3. The system as recited in claim 1 wherein said route design subsystem employs at least one packing set to measure an objective value associated with said ring.

4. The system as recited in claim 1 wherein an objective function orthogonal to an algorithm employed by said route design subsystem determines an objective value associated with said ring.

5. The system as recited in claim 1 wherein an objective value associated with said ring is determined by $$Z = \sum_{i \in \{1,3,12,\ldots\}} \sum_{c_k \in P_i} f(g(c_k), l(c_k)),$$

where $P_i$ is a packing set for granularity i and $g(c_k)$ and $l(c_k)$ are granularity and length, respectively of circuit $c_k$ in $P_i$, and f is a heuristic function.

6. The system as recited in claim 1 wherein said hitless migration sequence calls for ones of said circuits to be rerouted according to a selected one of:
    rerouting said ones to a different time slot,
    reversing a direction of said ones, and
    rerouting by both rerouting said ones to said different time slot and reversing said direction.

7. The system as recited in claim 1 wherein said route design subsystem identifies alternative routes that at least locally maximize an objective value associated with said ring.

8. The system as recited in claim 1 wherein said ring is selected from the group consisting of:
    a Unidirectional Path-Switched Ring (UPSR) in which said circuits are unprotected, and
    a Bidirectional Line-Switched Ring (BLSR).

9. The system as recited in claim 1 wherein said given pre-selected specific time slots are selected from the group consisting of:
    1,
    3,
    12,
    48, and
    192.

10. The system as recited in claim 1 wherein said ring conforms to a standard selected from the group consisting of:
    Synchronous Optical NETwork (SONET), and
    Synchronous Digital Hierarchy (SDH).

11. A method of rerouting circuits on a ring, comprising:
    defining a sequence of time slots, each time slot corresponding to a circuit capacity unit;
    identifying, for a circuit on said ring, an alternative route subject to an alignment constraint and assigned a number of contiguous time slots in said sequence, wherein said number of contiguous time slots corresponds to multiple circuit capacity units required by said circuit, and said assigned time slots start at one of given pre-selected specific time slots in said sequence pursuant to said alignment constraint; and
    determining a hitless migration sequence that allows said alternative route to be employed;
    wherein said method reroutes multiple circuits at any given time.

12. The method as recited in claim 11 wherein said identifying comprises employing a greedy algorithm to identify said alternative route.

13. The method as recited in claim 11 wherein said identifying comprises employing at least one packing set to measure an objective value associated with said ring.

14. The method as recited in claim 11 wherein said identifying comprises employing an objective function orthogonal to an algorithm to determine an objective value associated with said ring.

15. The method as recited in claim 11 wherein said identifying comprises employing $$Z = \sum_{i \in \{1,3,12,\ldots\}} \sum_{c_k \in P_i} f(g(c_k), l(c_k))$$

to determine an objective value associated with said ring, where $P_i$ is a packing set for granularity i and $g(c_k)$ and $l(c_k)$ are granularity and length, respectively of circuit $c_k$ in $P_i$, and f is a heuristic function.

16. The method as recited in claim 11 wherein said hitless migration sequence calls for ones of said circuits to be rerouted according to a selected one of:
    rerouting said ones to a different time slot,
    reversing a direction of said ones, and
    rerouting by both rerouting said ones to said different time slot and reversing said direction.

17. The method as recited in claim 11 wherein said identifying comprises identifying alternative routes that at least locally maximize an objective value associated with said ring.

18. The method as recited in claim 11 wherein said ring is selected from the group consisting of:
    a Unidirectional Path-Switched Ring (UPSR) in which said circuits are unprotected, and
    a Bidirectional Line-Switched Ring (BLSR).

19. The method as recited in claim 11 wherein said given pre-selected specific time slots are selected from the group consisting of:
    1,
    3,
    12,
    48, and
    192.

20. The method as recited in claim 11 wherein said ring conforms to a standard selected from the group consisting of:
    Synchronous Optical NETwork (SONET), and
    Synchronous Digital Hierarchy (SDH).

21. A system for rerouting circuits on a ring, comprising:
    means for defining a sequence of time slots, each time slot corresponding to a circuit capacity unit;
    means for identifying, for a circuit on said ring, an alternative route subject to an alignment constraint and assigned a number of contiguous time slots in said sequence, wherein said number of contiguous time slots corresponds to multiple circuit capacity units required by said circuit, and said assigned time slots start at one of given pre-selected specific time slots in said sequence pursuant to said alignment constraint; and means for determining a hitless migration sequence that allows said alternative route to be employed;
wherein said system is configured to reroute multiple circuits at any given time.

22. The system as recited in claim 21 wherein said means for identifying comprises means for employing a greedy algorithm to identify said alternative route.

23. The system as recited in claim 21 wherein said means for identifying comprises means for employing at least one packing set to measure an objective value associated with said ring.

24. The system as recited in claim 21 wherein said means for identifying comprises means for employing an objective function orthogonal to an algorithm employed to determine an objective value associated with said ring.

* * * * *